Figure 1:
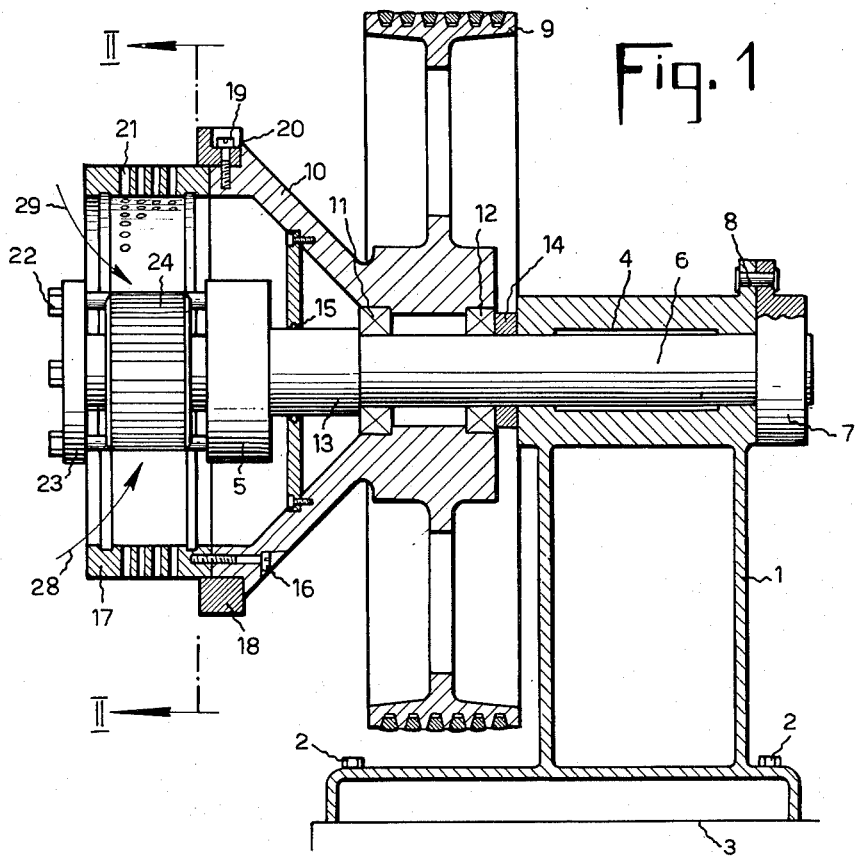

INVENTOR:
REINHARD KUHN
BY:
M. Glew and Toren
ATTORNEYS

3,167,033
PELLET MILL
Reinhard Kuhn, Uzwil, Switzerland, assignor to Gebrueder Buehler, Uzwil, Switzerland, a firm of Switzerland
Filed June 14, 1961, Ser. No. 117,178
Claims priority, application Switzerland, June 21, 1960, 7,019/60
2 Claims. (Cl. 107—14)

My present invention relates to improvements in pellet mills. Such mills usually comprise a relatively large diameter cylindrical press mold having a perforated cylindrical surface, this mold cooperating with at least a pair of relatively small diameter rollers which are arranged to have rotational engagement with the inner periphery of the press mold. These rollers are mounted on a roller carrier. Generally, the roller carrier is fixed against rotation so that the rollers, while rotatable, are rotatable about fixed axes, while the press mold itself is rotated about its axis.

The doughy masses which are to be extruded, and which usually are used for cattle feed, are fed into the press mold and, due to the relative rotation of the press mold and the rollers, are compressed between the press mold and the rollers rolling on the inner surface thereof so that the materials or masses are forced through the perforations in the press mold. Generally, there is a pair of rollers so that, as the press mold is rotating, the radial forces on the press mold, due to the pressing of the material between the press mold and rollers, are constantly changing in direction relative to a radius or diameter of the press mold. The pair of rollers are usually mounted at opposite ends of a diameter, and the radial forces are always exerted along such diameter. However, due to the relative rotation of the press mold, the point of force on the press mold is continually moving circumferentially of the press mold. As a result, there is a great wear and strain on the connection of the press mold to its carrier, due to the varying and uneven radial stresses on the mold during rotation of the latter.

The present invention is directed to a readily replaceable connecting member for connecting the press mold to its carrier and which is designed to absorb the stresses on the press mold as well as to center the press mold axially relative to its carrier. This connecting member is designed to be quickly and readily replaced after a predetermined amount of wear, and without any necessity for removing any of the important components of the mill to obtain access for replacement of the connecting member. For example, the mold carrier need not be removed. As a result of the connecting member absorbing the stresses on the press mold, and which stresses would normally be transmitted from the mold to its carrier, wear and tear on the relatively much more expensive press mold itself is largely obviated.

One form of the invention is shown, by way of example, in the drawing, in which—

Figure 2:
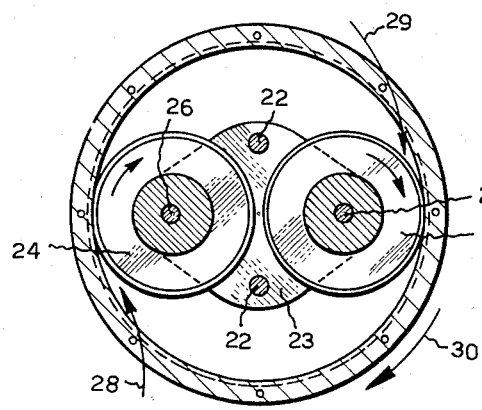

FIG. 1 is a vertical section through the press along the axis of rotation of the mold, and FIG. 2 is a section on the line II—II of FIG. 1.

Referring to the drawing, the illustrated pellet mill comprises a column or support base 1 which is secured by suitable fastening means, such as screws or bolts 2, to a supporting surface 3. The column or support base is formed with a bore 4 through which is mounted a shaft or arbor 6 which projects axially from the arbor and from the support base 1. This arbor 6 has fixedly secured thereto a roller carrier 5, and is connected to column 1 by an arm 7 and a pin 8 so as to be fixed against rotation relative to the column or support base 1.

As will be noted from FIG. 1 of the drawing, a mold carrier 10 is provided which has a relatively small diameter bearing portion mounted rotatably on arbor 6 in roller bearings 11 and 12 and retained between a collar or shoulder 13 and a spacer 14. This bearing portion has a relatively large diameter drive pulley 9 for the mold carrier integral therewith. The mold carrier 10 increases in diameter outwardly from the bearing portion to a relatively large diameter substantially cylindrical mounting portion. In the transitional conical portion of the mold carrier 10, there is mounted a sealing member 15 which prevents leakage of material from the press mold 17, which latter is detachably connected to its carrier 10 by screw 16, and also prevents penetration of material into the bearings 11 and 12. Screw 16 has the sole function of holding mold 17 axially against carrier 10, and does not absorb any radial stresses on the mold.

A pair of rollers 24, 25 are rotatably mounted on relatively fixed axles 26, 27 extending between carrier 5 and a cross head 23 connected to carrier 5 by suitable fastening means 22. It will be noted that the axes of rotation of the rollers 24, 25 are parallel to the axis of shaft or arbor 6 and are spaced at equal radial distances therefrom.

The mold or press mold 17 is substantially cylindrical and is in embracing rolling contact with the rollers 24, 25. The cylindrical surface of press mold 17 is formed with perforations 21, and it will be noted that mold 17 forms a substantially cylindrical axial extension of the mold carrier 10.

Mold 17 is additionally secured to mold carrier 10 by a readily replaceable mold centering wear ring 18 which commonly embraces mold 17 and the mounting portion of mold carrier 10, and overlaps the juncture of these two parts. Ring 18 seats against a shoulder 20 on the mold carrier and is retained in position by relatively readily accessible fastener means, such as bolts 19, extending through the ring 18 and threaded into the mold carrier 10. It will be noted that these fastening means 19 extend radially of the mold carrier and of the mold and, during the generation of radial forces on the mold during operation of the mill, the forces exerted on the fastening means 19 are substantially solely tension forces.

The protective casing conventionally provided above the belt drive, as well as the goods-feed device and a goods-delivery duct surounding the press mold have been omitted from the drawing, as they are irrelevant for an understanding of the invention. The arrows 28, 29 indicate the direction of goods introduction, and arrow 30 shows the direction of rotation of press mold 17.

The mode of operation of the pellet mill described above is as follows:

In the illustrated pellet mill, the press mold 17 rotates clockwise, as indicated by the arrow 30 in FIG. 2. The doughy masses fed into the press mold in the directions of the arrows 28, 29 are forced, due to the relative rolling contact between the interior surface of the press mold and the rollers 24, 25, to flow between the rollers and the interior surface of the press mold so that the material is forced outwardly through the perforations 21. During this operation, considerable radial forces are developed and act to distort the press mold 17. In arrangements known hitherto, such varying and uneven forces have resulted in fairly rapid wear of the press mold and its means attaching it to the mold carrier 10.

By mounting press mold 17 within readily replaceable wear ring 18, in the manner shown in the drawing, these uneven and varying forces are substantially absorbed by the readily replaceable wear ring 18, and the radially disposed fastening means 19 securing ring 18 to mold carrier 10 are subjected substantially solely to tension stresses. The wear ring 18 not only retains the mold 17 in position on the carrier 10, but also serves to center the mold relative to the carrier 10. It will be noted that the fastening means 19 are very readily accessible without removal of any important parts of the pellet mill, thus allowing only the retaining ring 18 and the mold 17 to be disengaged from the carrier 10, without requiring removal of the carrier 10 in order to replace the wear ring 18.

As wear ring 18 constitutes a simply formed and readily replaceable machine part, it may be readily exchanged for a new ring as soon as its wear has attained a certain extent.

I claim:

1. A pellet mill for extruding plastic masses used as cattle feed or the like, said mill comprising, in combination, a support base, a non-rotatably mounted roller carrier fixed to the base; at least a pair of similar rollers mounted on said carrier for rotation about axes at equal radial distances from the longitudinal center line of said carrier; a mold carrier including a relatively small diameter bearing portion mounted rotatably on said base, said mold carrier increasing in diameter outwardly from said bearing portion to a relatively large diameter substantially cylindrical mounting portion having an inner diameter substantially equal to that of a cylinder tangent to said rollers and a substantially cylindrical outer surface; a substantially cylindrical mold in embracing rolling contact with said rollers and having mold perforations therethrough, the outer surface of said mold forming a substantially cylindrical coaxial extension of the outer surface of the mounting portion of said mold carrier, axially extending clamping means securing said mold to said mold carrier; and a replaceable mold centering wear ring telescoped over the outer surface of said mold and the mounting portion of said mold carrier and axially overlapping the juncture of said mold and said mold carrier; and readily accessible and radially extending fastener means disengageably securing said ring to said mold carrier; said wear ring absorbing the varying and uneven radial stresses on said mold resulting, during rotation of said mold, from pressing the material between said mold and said rollers rolling on the inner surface thereof, through the mold perforations.

2. A pellet mill for extruding plastic masses used as cattle feed or the like, said mill comprising, in combination, a support base, a non-rotatably mounted roller carrier fixed to that base; at least one roller mounted on said carrier for rotation; a mold carrier including a relatively small diameter bearing portion mounted rotatably on said base, said mold carrier increasing in diameter outwardly from said bearing portion to a relatively large diameter substantially cylindrical mounting portion having an inner diameter substantially equal to that of a cylinder tangent to said roller and a substantially cylindrical outer surface; a substantially cylindrical mold in embracing rolling contact with said roller and having mold perforations therethrough, the outer surface of said mold forming a substantially cylindrical coaxial extension of the outer surface of the mounting portion of said mold carrier, axially extending clamping means securing said mold to said mold carrier; and a replaceable mold centering wear ring telescoped over the outer cylindrical surface of said mold and the mounting portion of said mold carrier and axially overlapping the juncture of said mold and said mold carrier; and readily accessible and radially extending fastener means disengageably securing said ring to said mold carrier; said wear ring absorbing the varying and uneven radial stresses on said mold resulting, during rotation of said mold, from pressing the material between said mold, and said roller rolling on the inner surface thereof, through the mold perforations.

References Cited by the Examiner
UNITED STATES PATENTS

| | | | |
|---|---|---|---|
| 2,240,660 | 5/41 | Meakin | 107—8 |
| 2,241,546 | 5/41 | Evenstad et al. | 107—8 |
| 2,778,323 | 1/57 | Money | 107—14 |
| 2,798,444 | 7/59 | Meakin | 18—12 X |
| 2,994,918 | 8/61 | Landers | 18—12 X |

ROBERT E. PULFREY, *Primary Examiner.*

J. D. SEERS, CHARLES WILLMUTH, *Examiners.*